G. J. COLES.
AUTOMATIC COUPLING FOR TRAIN PIPES AND THE LIKE.
APPLICATION FILED JULY 18, 1914.
1,165,754. Patented Dec. 28, 1915.
3 SHEETS—SHEET 2.
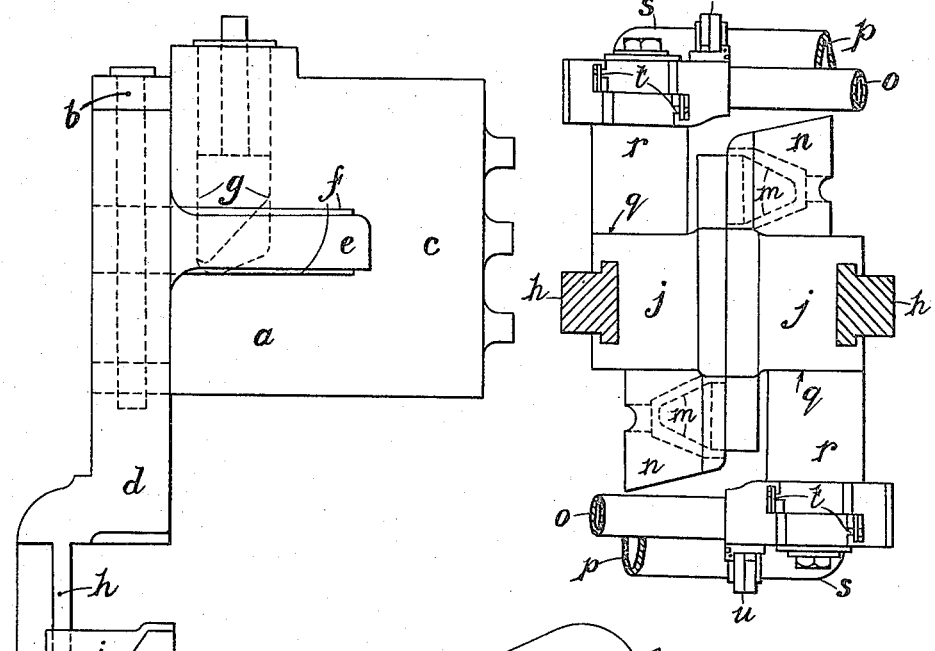
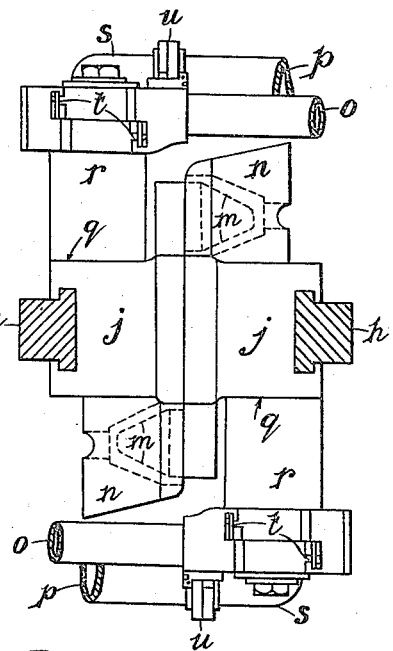
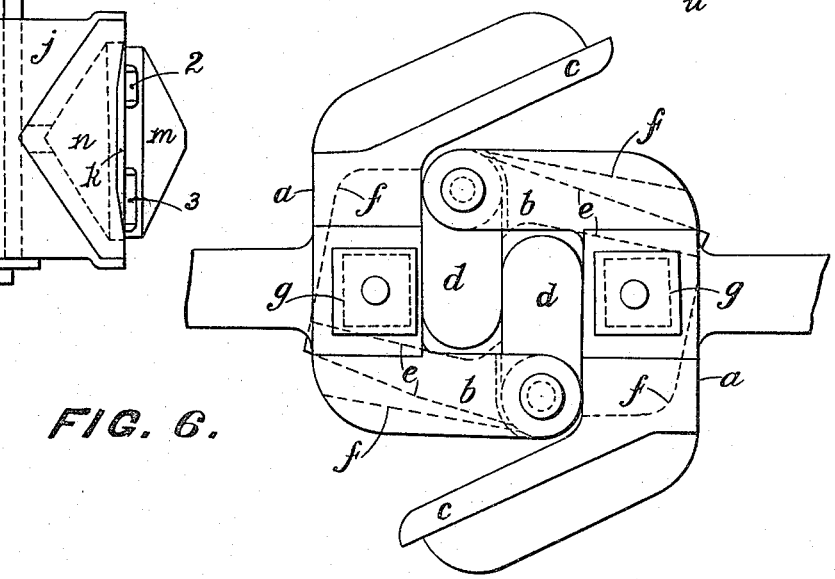

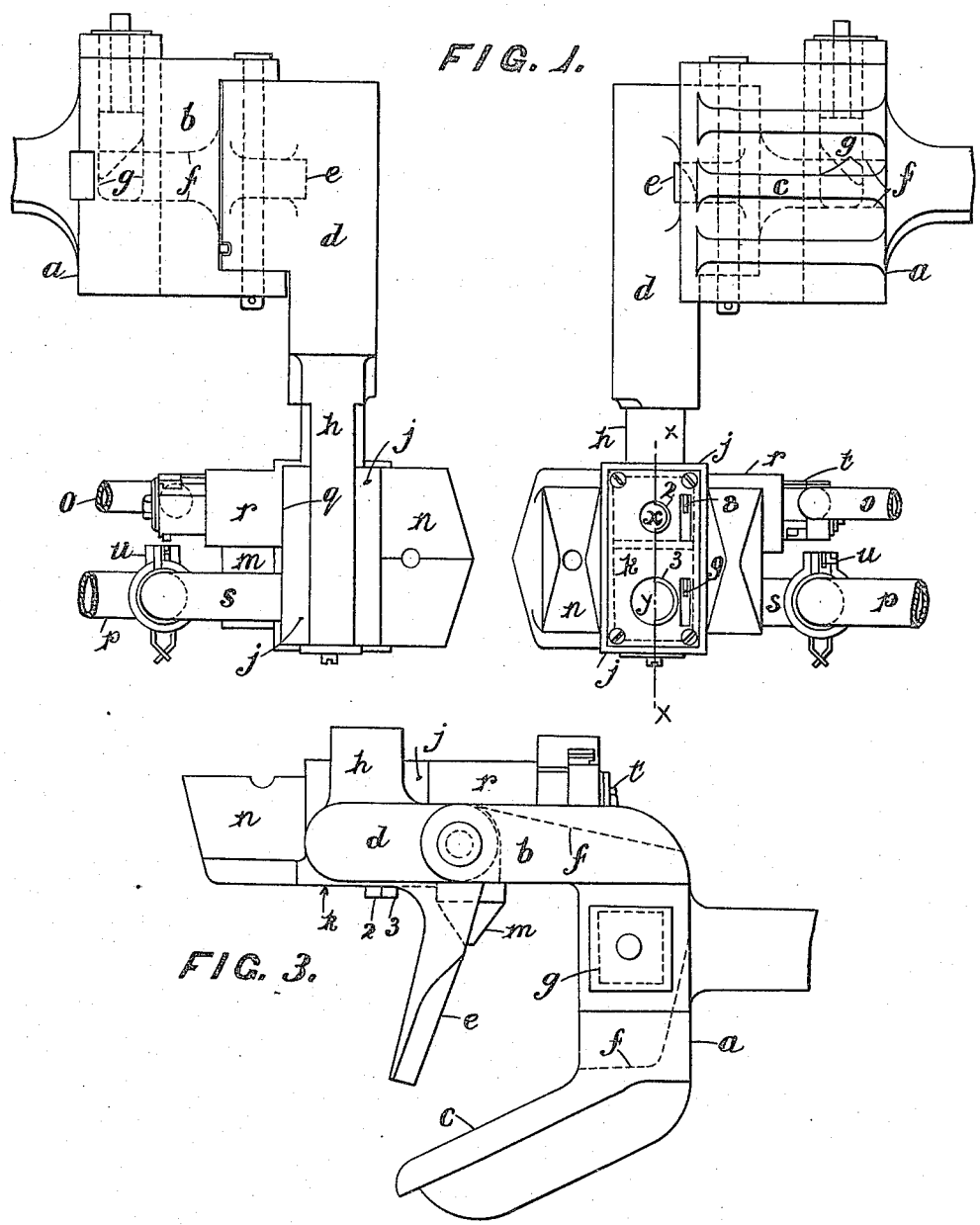

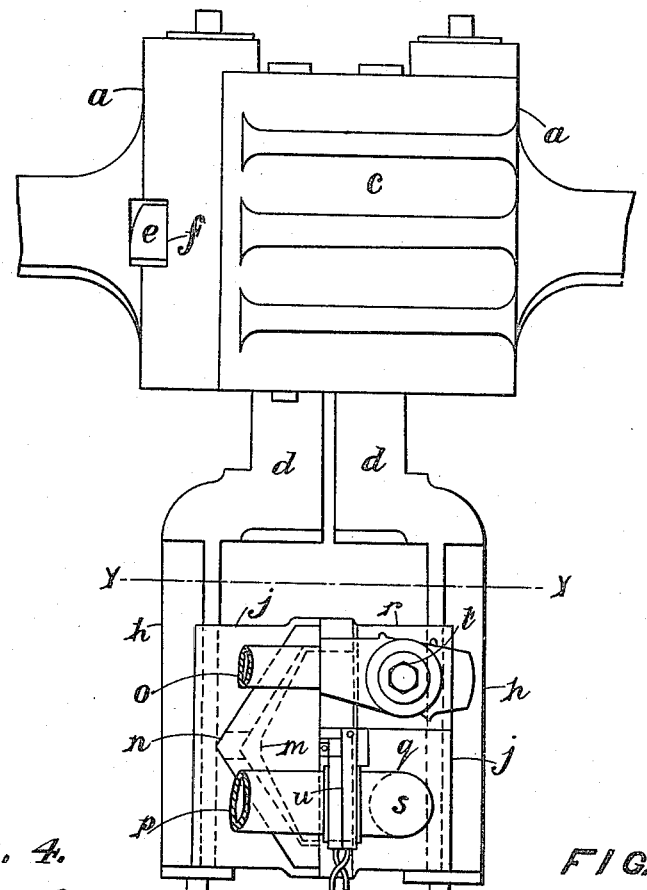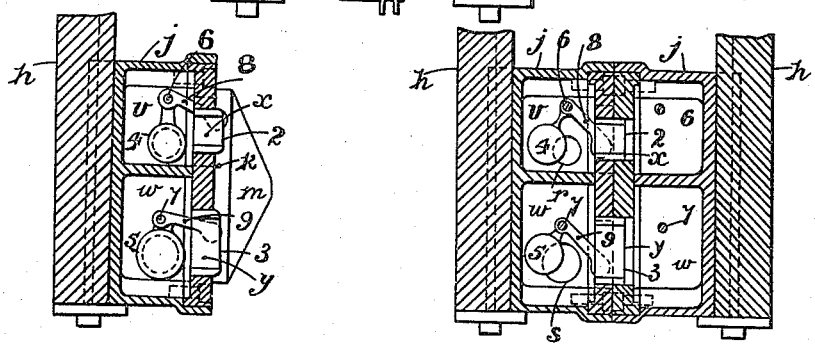

UNITED STATES PATENT OFFICE.

GEORGE JAMES COLES, OF GATESHEAD, ENGLAND.

AUTOMATIC COUPLING FOR TRAIN-PIPES AND THE LIKE.

1,165,754. Specification of Letters Patent. Patented Dec. 28, 1915.

Application filed July 18, 1914. Serial No. 851,726.

*To all whom it may concern:*

Be it known that I, GEORGE JAMES COLES, a subject of the King of Great Britain and Ireland, residing at 5 Lavender Gardens, Low Fell, Gateshead, in the county of Durham, England, have invented new and useful Improvements in Automatic Couplings for Train-Pipes and the like, of which the following is a specification.

This invention relates to means for automatically connecting the brake and other pipes of railway and like vehicles fitted with automatic couplings of the type comprising a coupling member mounted at each end of the vehicle and provided with jaws one of which carries a pivoted coupling projection, and with a recess between said jaws in which is disposed a bolt or other locking device, the arrangement being such that, on two vehicles coming together, the jaws of the coupling member of one vehicle come against and co-act with the jaws of the complementary member of the other vehicle to turn the pivoted coupling projection of one coupling member into the recess in the other member to raise or move and pass behind the bolt or locking device therein which falls or is moved again to lock the coupling projection in the recess, and the two vehicles are thus coupled together.

The object of the present invention is to provide, in combination with automatic couplings of the type referred to, improved means for automatically connecting the brake and other pipes of the vehicles.

According to the present invention, I mount upon an extension of the usual pivoted knuckle or hook of each coupling member a single coupling box provided with a passage or passages to which the ends of the brake or other pipe or pipes is or are directly attached, said passage or passages leading to and opening on one face of the coupling box, the arrangement being such that, when two coupling members come together and their pivoted knuckles or hooks are turned behind one another, the coupling boxes on the extensions thereof are also turned to engage behind one another with their coupling faces in a plane parallel with the ends of the vehicles, so that the mouths of their passages are in coincidence and a through communication is established between the brake and other pipes on the two vehicles.

In the accompanying drawings Figure 1 is a side elevation of a pair of coupling members of the type above referred to provided with one construction of my improved means for automatically connecting together the brake and steam or similar pipes of the two vehicles whereon said coupling members are mounted, the coupling members being shown in their uncoupled position; Fig. 2 is a face view, and Fig. 3 is a plan of one of the coupling members of Fig. 1. Fig. 4 is a section on the line X—X in Fig. 1; Fig. 5 is a side elevation, and Fig. 6 is a plan of the two coupling members in their coupled position. Fig. 7 is a plan on the line Y—Y in Fig. 5, and Fig. 8 is a similar view to Fig. 4 showing the two boxes in their coupled position.

In the drawings, Fig. 1 is drawn to a smaller scale than Figs. 2 to 8.

Referring to the drawings, the automatic coupling illustrated comprises two similar coupling members $a$, $a$ mounted one on each vehicle centrally of the end thereof. Each coupling member $a$ is provided with two jaws $b$, $c$ to one of which, $b$, is pivoted a knuckle or hook $d$ carrying a tail $e$, and with a recess $f$ in which is disposed a bolt $g$ or other locking device, the arrangement being such that, on two vehicles coming together, the jaws $b$, $c$ of the coupling member $a$ on one vehicle come against and co-act with the jaws $b$, $c$ of the complementary coupling member $a$ on the other vehicle to turn the pivoted knuckle $d$ carrying the tail $e$ of each coupling member into the recess $f$ in the other member to raise or move and pass behind the bolt $g$ or other locking device therein which falls or is moved to lock the tail $e$ in the recess $f$, and the two vehicles are thus coupled together.

According to the embodiment of my invention illustrated in the accompanying drawings, I enlarge and downwardly extend the pivoted knuckle $d$ of each coupling member $a$, and I mount upon a vertical slide $h$ formed on or carried by said downward extension a box $j$. The box $j$ is thus carried below the coupling member $a$ and is free to slide vertically on the slide $h$. The face $k$ of the box $j$ which corresponds to the face of the knuckle $d$ whereupon the tail $e$ is formed, is provided at one side with a pyramidal or other suitably shaped tongue or spigot $m$, and at the other side with a correspondingly shaped recess or socket $n$. The face $k$ of the knuckle $j$, when in the normal or uncoupled position, lies in a plane approximately at right angles to the end of the vehicle, and I will hereinafter refer to this face $k$ as the coupling face of the box $j$. The usual brake pipe $o$ and steam pipe $p$ of the vehicle are directly attached in any suitable fashion to the side face $q$ of the box $j$, said face $q$ being that which is normally nearer to the end of the vehicle. Conveniently two pipes $r$ and $s$ are provided projecting from the face $q$ of the box $j$, said pipes being fitted at their outer ends with connections such as $t$ and $u$ of any well-known type with which complementary connections on the ends of the air and steam pipes $o$ and $p$ engage to attach the air and steam pipes to the box $j$. The inner ends of the pipes $r$ and $s$ open into two chambers $v$ and $w$ provided in the box $j$, as shown best in Fig. 4. In the coupling face $k$ of the box $j$ are provided two orifices $x$ and $y$ communicating respectively with the chambers $v$ and $w$. The orifices $x$ and $y$ are preferably provided with projecting half-nozzles 2 and 3 as shown. In the passages leading from the air and steam pipes $o$ and $p$ to the orifices $x$ and $y$ are provided any suitable form of valves which are normally closed but can be opened by projections or the like on the opposing box $j$ when two coupling members come together. Conveniently, and as shown best in Fig. 4, slide valves 4 and 5 pivoted on pins 6 and 7 are arranged at the mouths of the pipes $r$ and $s$ where they open into the chambers $v$ and $w$, said slide valves 4 and 5 being adapted to be normally retained in their closed position by gravity or by suitable springs but adapted to be rotated on their pivots to uncover the mouths of the pipes $r$ and $s$ by arms 8 and 9 projecting from openings in the coupling face $k$ of the box $j$. Or pivoted flap valves may be arranged within the chambers $v$ and $w$ adapted to normally cover the orifices $x$ and $y$ and to be retained in their closed position by gravity and by the pressure of the air and steam in the chambers, or by springs, but provided with arms similar to the arms 8 and 9 whereby they can be moved to uncover the orifices $x$ and $y$. Or the half-nozzles 2 and 3 may be adapted so that when they enter the orifices $x$ and $y$ of the complementary box $j$ they open the valves therein. Suitable rubber or similar washers will be provided where required to insure tight joints, and, if necessary or desirable, the coupling face $k$ of the box $j$ may be edged or faced with rubber or the like.

In operation, the action of the improved means for connecting the brake and steam or other pipes is as follows:—When two coupling members $a$, $a$ come together, the jaws $b$, $c$ of one coupling member co-act with the jaws $b$, $c$ of the other coupling member, and the pivoted knuckle $d$ of each member is turned through about 90° so that the tail $e$ thereon enters the recesses $f$ in the other member, raises the bolt $g$ or the like therein and passes behind same when the bolt falls again, and the tail $e$ on each member is locked in the recess $f$ in the other member, as shown in Figs. 5 and 6. Simultaneously with the turning of the tails $e$, $e$, the boxes $j$, $j$ on the slides $h$, $h$ on the pivoted knuckles $d$, $d$ of the two coupling members $a$, $a$ are turned inward through about 90°, and, as shown in Figs. 7 and 8, the spigot $m$ on each box $j$ engages with and enters the socket $n$ on the other box $j$ to bring the coupling faces $k$, $k$ of the boxes into alinement. When the boxes $j$, $j$ come together the projecting arms 8, 8 and 9, 9 are pressed inward and move the pivoted valves 4, 4 and 5, 5 to uncover the mouths of the pipes $r$, $r$ and $s$, $s$ and, the half-nozzles 2 and 3 on one box having entered the orifices $x$ and $y$ on the other box, a good tight joint is made and through communications are established between the brake and steam or other pipes $o$, $o$ and $p$, $p$ of the two vehicles.

When in the coupled position the box $j$ of the coupling member $a$ on one vehicle lies between the box $j$ of the complementary coupling member $a$ on the other vehicle and the end of the latter, the coupling faces $k$, $k$ of the boxes being turned into a plane parallel with the ends of the vehicles. It will be seen that, by this arrangement, the greater the tractive pull upon the coupling members of the automatic coupling, the more tightly will the two boxes $j$, $j$ be pressed together. The sliding mounting of the boxes $j$, $j$ upon the slides $h$, $h$ allows of a certain amount of vertical play between the boxes and the coupling members, and also allows the coupling of two boxes which are not at exactly the same height.

To uncouple the coupling members $a$, $a$ their bolts $g$, $g$ or other locking devices are raised or operated to release the coupling projections $e$, $e$ in the recesses $f$, $f$. Means may be provided for raising or operating both bolts or locking devices by means of a single lever provided on one of the coupling members, or means may be combined with the boxes $j$, $j$ for this purpose. When both bolts $g$, $g$ have been released, the pivoted knuckles $d$, $d$, carrying the coupling projections $e$, $e$ and the boxes $j$, $j$ will swing on their vertical pivots into position ready for coupling again. As the brake and steam or other pipes $o$, $o$ and $p$, $p$ are connected to the boxes $j$, $j$ at the sides $q$, $q$ which lie nearest to the respective vehicles, the weight of said pipes will assist in bringing the pivoted knuckles $d$, $d$ and boxes $j$, $j$ into the correct position for coupling.

What I claim and desire to secure by Letters Patent is:—

An automatic coupling for vehicles with pipe connections, comprising a coupling member, jaws on said coupling member, a knuckle pivoted on one of said jaws, a tail on said knuckle adapted to extend between the jaws, a locking device on said coupling member adapted to be engaged by said tail on the said knuckle, a vertical guide extending below said knuckle, a box slidably mounted on said guide, a tongue member on one side of said box, said box having a socket member on the other side thereof and also having chambers therein, an inlet to each of said chambers, and a valve controlling each of said inlets, an outlet to each of said chambers, connecting nozzles to said outlets, means for operating the said valves when the couplings come together, the knuckles rotating through 90° when the coupling takes place, the locking device acting on the tail on the said coupling member and tending to pull the face of the box on one coupling member into close contact with the face of the corresponding coupling member when a pull is applied to the coupling.

In testimony whereof I have signed my name to this specification in the presence of two subscribing witnesses.

GEORGE JAMES COLES.

Witnesses:
HERBERT HOWARD,
GEORGE FORSTER.

Copies of this patent may be obtained for five cents each by addressing the "Commissioner of Patents, Washington, D. C."